United States Patent Office 3,041,329
Patented June 26, 1962

3,041,329
MANUFACTURE OF CELLULOSE ESTERS OF ALIPHATIC ACIDS
Norman B. Campbell, Drummondville, Quebec, and Laurent Berthiaume, Marcotte Village, Quebec, Canada, assignors to Canadian Celanese Limited, Montreal, Quebec, Canada
No Drawing. Filed Mar. 16, 1959, Ser. No. 799,476
Claims priority, application Canada May 7, 1955
2 Claims. (Cl. 260—227)

This invention relates to the manufacture of cellulose esters of aliphatic acids by a process of the solution type in which a lower aliphatic acid is used to dissolve the cellulose ester as it is formed and sulphuric acid is used as a catalyst. The invention also relates to making extruded articles from the cellulose esters formed.

The invention is particularly applicable to preparing cellulose esters of lower aliphatic acids (i.e. aliphatic acids containing 2 to 4 carbon atoms in the molecule), for example cellulose acetate. The usual dissolving acid is acetic acid.

When cellulose acetate, for example, is made by processes of the type described, the ester as first obtained normally contains a proportion of sulphate groups which, unless substantially completely removed, render it unstable towards heat. If an acetone-soluble cellulose acetate is required, the cellulose acetate first formed (known as the primary cellulose acetate) is partly hydrolysed so as to split off a proportion of its acetyl groups and give it an acetyl value of say 52.5–56.5% reckoned as acetic acid. In this process, which is termed ripening, most or substantially all of the sulphate groups are also split off, so greatly increasing the stability of the cellulose acetate.

On the other hand, when it is desired to produce a cellulose triacetate (using the term in its usual connotation to include cellulose acetates of acetyl value of about 59–62.5%) and especially cellulose triacetate having an acetyl value closely approaching the maximum of 62.5%, e.g., between 61 and 62.5%, little or no hydrolysis of acetate groups is permissible, and thus the concomitant splitting off of sulphate groups does not take place, or at least not to the same extent. In consequence the production of a heat-stable cellulose triacetate of acetyl value approaching the maximum is a matter of greater difficulty.

One method by means of which the proportion of sulphate groups in cellulose acetate can be reduced is to employ only a small quantity of sulphuric acid as catalyst in the production of the cellulose acetate. It is found, however, that when acetic acid is used as the solvent in the acetylation, reduction of the amount of catalyst used tends to prevent a smooth gel-free solution being obtained. For this reason it is usual to employ quite a high proportion of sulphuric acid, for example about 10–16%. (Here and throughout this specification amounts of reagents and catalyst used in the esterification of cellulose are expressed in terms of the dry weight of the cellulose unless otherwise stated).

APPLICANTS' DEVELOPMENT

The applicants have now found that special results are obtained if an exceptionally small amount of sulphuric acid is employed as a catalyst, compared with the normal esterification processes, less than about one half of one percent (0.5%), the whole of this catalyst being uniformly distributed throughout the cellulose in the course of a pretreatment with an aliphatic acid containing up to 4 carbon atoms in the molecule, preferably acetic acid.

The applicants have found that if such small amounts of sulphuric acid are introduced into the cellulose in this way, and the esterification is conducted at temperatures between about 70° C. and the boiling point of the esterification mixture the catalyst is capable of catalysing the esterification so effectively that smooth, substantially gel-free and sulphate crystal-free solutions are obtained. The upper limit of the esterification temperature lies between 118° C. and 139° C. depending on the composition, but the general process described can have an esterification temperature between 70° C. and the boiling point (which is between 118° C. and 139° C.). Because of the small amount of catalyst present, the relatively high temperature does not cause undue degradation of the cellulose molecule with consequent loss of viscosity.

A continuous esterification can be effected by adding pretreated cellulose and esterification acid continuously to one part of a machine in which the materials are reacted and conveyed to a point of discharge from the machine at which point the reaction is complete. Because of the difficulty of moving the reacting mixture in a positive manner through the machine, there is a tendency for unreacted cellulose to mix with reacted "dope." The net effect is that the reaction time in a continuous acetylizer is prolonged beyond that required for the same reactants in a batch reactor. Prolonging an esterification reaction normally results in an undesirable secondary reaction, namely an undue amount of molecular-length degradation. The process of the present invention is quite different in this respect in that molecular-length degradation is very slight on completion of esterification. Consequently the present process makes it specially possible to carry out the esterification as a continuous process.

The applicants have also found that the acid esterification solution so produced, contrary to what is generally the case with esterification solutions, is capable of being readily filtered, permitting its direct extrusion into a precipitant or drying medium to convert the cellulose ester to filaments, films, or other extruded articles.

The usual practice in manufacturing articles of this type is to carry out the esterification procedure to provide an esterification solution containing the cellulose ester. The cellulose ester is then precipitated from the solution and subsequently redissolved to form a solution which is used for extruding, for example, for spinning fibers and producing films.

The isolation of the cellulose ester from the solution is necessary because of gels and sulphate crystals resulting from normal esterification procedures which otherwise render the solution incapable of being filtered and used directly for extrusion.

In describing the invention in more detail it will be convenient to refer particularly to the production of cellulose triacetate. It will be understood, however, that the information given will apply also mutatis mutandis to the production of cellulose esters of other aliphatic acids, especially cellulose propionates, butyrates, acetate propionates and acetate butyrates in which the cellulose is substantially completely esterified in the sense of containing substantially less than 0.25, for instance less than 0.05, free hydroxyl groups for each anhydroglucose unit. It will be understood also that the cellulose triacetate or other ester first produced can if desired be ripened to modify its solvent properties, giving for example an acetone-soluble cellulose acetate.

Referring more specifically to the process steps, the sulphuric acid is uniformly distributed throughout the cellulose in admixture with glacial or highly concentrated aqueous acetic acid as the main pretreatment acid. Preferably 94% to 100% concentrated acetic acid is used. If desired, part of the acetic acid used for pretreatment, but preferably not more than half, may be relaced by acetic anhydride. The acid mixture may be sprayed onto the cellulose, which is then preferably stirred or tumbled throughout the pretreatment, or the cellulose may be immersed in the acid mixture. These operations are preferably carried out at a temperature within the range from about 24° C. to about 40° C. The cellulose onto which the pretreatment acids have been sprayed or which is immersed in the acids is held for a time sufficient to allow uniform penetration of the pretreatment acids to all parts of the cellulose. Usually, this penetration will be completed in an hour or less, though the pretreatment may be carried on for a longer time if desired.

The uniform penetration of the cellulose by the pretreatment acids may be facilitated and speeded up by first soaking the cellulose in an aqueous liquid, e.g. water or a dilute aqueous acetic acid, which may contain part of the sulphuric acid to be used in the pretreatment and acetylation. After such a treatment with an aqueous liquid the cellulose may if desired be squeezed, so as to remove part of the liquid before adding the pretreatment acids. Similarly when the cellulose has been soaked in the pretreatment acids it may be squeezed before the acetylation proper so as to reduce the amounts of acetic acid and sulphuric acid on the cellulose to the desired values.

The squeezing procedure results in the reduction of the amount of sulphuric acid remaining to as little as 0.01% and according to the applicants' procedure it is important that the amount remaining be no higher than 1.0% by dry weight on the cellulose. Preferred ratios of esterifying acid to cellulose are from 3/1 to 10/1, although there is no upper limit to these ratios.

It has been found that the viscosity of the cellulose triacetate obtained is directly dependent on the rate of acetylation, regardless of the combination of acetylation temperature and amount of sulphuric acid employed. The rate of reaction and the amount by which the temperature of the acetylation mixture rises depends of course on a number of factors including the amounts of acetic acid and anhydride present in relation to the amount of cellulose, the presence or absence of small amounts of water in the pretreated cellulose when it is brought into contact with the acetylation liquor, and the degree of cooling or heating, if any, employed during the acetylation, as well as the amount of sulphuric acid present; thus the viscosity of the product can be controlled for example by so choosing the initial temperature of the acetylation liquor that the temperature during the acetylation rises to the appropriate level.

The relatively high acetylation temperatures used in accordance with the invention have important advantages.

One of these is that at these temperatures acetic acid dissolves cellulose triacetate more readily than at the temperatures usually employed, and also gives solutions having a lower viscosity at any particular concentration. As a result it is possible to use considerably less acetic acid than has heretofore been needed and still to obtain a smooth gel-free solution, thus effecting a considerable saving in the amount of acetic acid that has to be treated in the recovery plant. Indeed, the amount of liquid in the acetylation mixture may be so low that, before the acetylation begins, the mixture has the form of a wet fibrous mass of cellulose, as opposed to the usual suspension of cellulose in a body of acetylation liquor. Further, in spite of the higher concentration of the triacetate solutions then obtained, they may have much the same viscosity as, or even a lower viscosity than, the more dilute solutions formed in the known processes, so that acetylators of known type can be used without throwing any extra burden on the stirrers or the motors used to drive them.

Another advantage lies in the possibility of carrying out the acetylation at the boiling point of the acid while still obtaining a product of useful viscosity. This is a very simple and advantageous method of disposing of surplus heat, if any, produced in the acetylation and of keeping constant the acetylation temperature. The acetic acid vapor formed may be fed to a reflux condenser and after condensation returned to the acetylator, or if sufficient acetic acid is initially present part or all of that vaporised may be allowed to pass from the acetylator to a separate receiver and condenser, so again reducing the load on the acetic acid recovery plant. When it is desired to operate at the boiling point of the acetic acid it will generally be advisable to use as catalyst sulphuric acid of concentration not exceeding 0.1% so as to avoid excessive degradation. Neither precooling of the acetylation liquor, nor cooling of the acetylation mixture by heat exchange of the usual type, will generally be required; indeed if less than 0.1% of catalyst is used it will generally be necessary, initially, to supply heat to the acetylation mixture from an external source.

It is a particular advantage of the invention that the products are already highly stable, so that no separate stabilization treatment is needed. Thus cellulose triacetate may be precipitated from the acetylation solution as soon as the acetylation is complete, for example, by mixing in water or dilute acetic acid in the usual way. After being washed and dried, such a cellulose triacetate will normally have a combined sulphate content as low as, or even lower than 0.015%, and is ready, without further treatment, for use in the manufacture of fibers or films by extrusion including melt extrusion.

If desired, however, before it is precipitated the cellulose triacetate may be ripened, for example to acetone-solubility, in the solution, preferably at a temperature above about 100° C. and especially between about 100° C. and 150° C.

The esterification procedure described above including the manner of introducing the catalyst in the pretreatment is necessary in providing an esterified solution free of gels or crystals and which may be readily filtered and extruded through fine orifices into a precipitating or drying medium to produce useful articles without the need to recover the dry ester and redissolve it in a secondary solvent. Due to the small amount of catalyst used, it is found that even if an equivalent amount of neutralizing salt, such as magnesium acetate, is added at the end of esterification, there are no sulphate crystals visible in the solution which is characteristically bright and transparent.

This is quite unlike primary esterification solutions, in which conventional amounts of sulphates are present, these are invariably opaque and more difficult to filter due to the insolubility of the sulphates. If the ester is recovered by precipitation, washing and drying, its melt-spinning properties are improved by filtration of the acid-ester solution before precipitation.

The ester may be recovered in the form of useful articles by filtering the esterified solution, with or without dilution, with further acid, and extruding it into a coagulating medium. Alternatively, it may be extruded into a medium which will cause evaporation of the acids. Again, the ester may be recovered from the primary acid-ester solution by precipitation, washing free of acids, drying and grinding. It is finally melt-extruded without further treatment, to form useful articles. The first two methods are preferred, and these are believed to be quite different from what is normally expected of a primary esterification dope which is not usually filtrable so it can be used directly for extruding.

In practice, it is not usually found necessary to add a sulphuric acid neutralizer on completion of the applicants' low sulphuric, high temperature, esterification, nor is it necessary to add water while raising the temperature of the mass as might be done with higher amounts of sulphates to split the sulphates so as to achieve good heat stability. This is because the rate of cellulosic molecular length degradation which occurs after completion of esterification, is negligible, quite unlike esterifications involving conventional amounts of sulphuric. This is believed due to reaction between the sulphuric acid and the excess of acid anhydride as a result of the high temperature level. This reaction deactivates the sulphuric acid which normally degrades the molecular length. This same characteristic makes the process particularly adaptable to continuous esterification methods.

The invention is illustrated by the following examples, in which the "parts" given are parts by weight.

*Example I*

15 parts of wood pulp were soaked for 1 hour at 25° C. in water containing sulphuric acid in concentration 0.023%, and the pulp was then first rinsed and afterwards soaked in 98% aqueous acetic acid containing sulphuric acid in concentration 0.023%. After about 1 hour the bulk of the liquid was run off and the pulp squeezed until it contained about 3 times its dry weight of liquid. This concluded the pretreatment. The pretreated pulp was then added to about 215 parts of a mixture of acetic anhydride and acetic acid containing 96% of anhydride, and the mixture was stirred until a clear solution had formed. The reaction conditions were varied so as to allow the temperature to rise to different levels in different runs. From the clear solution the triacetate was precipitated by mixing in dilute acetic acid in the known way, and the precipitate was washed and dried. Three typical runs gave the figures shown in Table 1. In all cases the cellulose triacetate had a good heat stability, even though it was given no separate stabilisation treatment of any kind.

TABLE 1

| Maximum Acetylation Temperature | Acetylation Time (Minutes) | Intrinsic Viscosity of Cellulose Triacetate, dl./gm. |
|---|---|---|
| 110° C | 5 | 1.5 |
| 80° C | 35 | 2.1 |
| 60° C | 345 | 2.6 |

The intrinsic viscosity was calculated on the basis of the relative viscosities of dilute solutions of cellulose triacetate, (0.1 to 0.5%), in 90/10 (by volume) mixtures of methylene chloride and methanol, the intrinsic viscosity calculated using as the cellulose triacetate concentration units "grams of bone-dry triacetate per decilitre of solvent."

*Example II*

50 parts of wood pulp were sprayed with 150 parts of glacial acetic acid containing 0.025 parts of sulphuric acid (i.e. 0.05% on the weight of the cellulose) and tumbled for 2 hours at room temperature. The pretreated cellulose was then added to about 260 parts of a mixture of acetic anhydride and acetic acid containing 96% of acetic anhydride and the mixture was kept under a reflux condenser and stirred until it had formed a clear solution. The temperature reached 116° C. and the solution became clear after 30 minutes. The cellulose triacetate was then precipitated, washed and dried. It had an intrinsic viscosity of 1.4 dl./gm. and excellent heat stability.

*Example III*

Three runs were made under the conditions of Example II except that the pretreatment liquid contained 0.25 part of sulphuric acid (i.e. 0.5% on the weight of the cellulose). The results of these runs are summarised in Table 2.

TABLE 2

| Maximum Acetylation Temperature | Acetylation Time (Minutes) | Intrinsic Viscosity of Cellulose Triacetate, dl./gm. |
|---|---|---|
| 70 | 41 | 1.5 |
| 88 | 9 | 1.2 |
| 95 | 6 | 0.8 |

The heat stability of all the products was good.

*Example IV*

50 parts of cotton were sprayed with 150 parts of glacial acetic acid containing either 0.1 or 0.25 part of sulphuric acid and tumbled for 1 hour at room temperature. The pretreated cotton was then added to about 260 parts of either 96% or 60% acetic anhydride (the remainder being acetic acid in both cases) and the mixture stirred until the solution had cleared. After which, the cellulose triacetate was precipitated, washed and dried. The results are shown in Table 3.

TABLE 3

| Amount of Sulphuric Acid (Percent on Cellulose) | Acetic Anhydride Concentration (Percent) | Maximum Acetylation Temperature, °C. | Acetylation Time (Minutes) |
|---|---|---|---|
| 0.5 | 96 | 76 | 29 |
| 0.2 | 96 | 106 | 27 |
| 0.5 | 60 | 81 | 35 |
| 0.2 | 60 | 105 | 23 |

In each case the heat stability of the product was good.

*Example V*

Wood pulp (40 parts) was soaked for an hour in water at 25° C., rinsed once with glacial acetic acid, squeezed to about 4 times its original weight, introduced into 4 times its original weight of glacial acetic acid containing 0.04 part of sulphuric acid at 25° C., and after 1 hour squeezed to 4 times its original weight. The resulting pretreated pulp was added to a large volume of 96% acetic anhydride (the remainder being acetic acid) at 25° C., allowed to soak for 5 minutes and then squeezed to 4 times its original weight and allowed to stand. The temperature of the mass rose to 87° C., and after 240 minutes a clear solution had formed from which the cellulose triacetate produced was precipitated and the precipitate washed and dried. The intrinsic viscosity of the cellulose triacetate was 1.3 dl./gm. and its heat stability was very good.

*Example VI*

One part of cellulose was reacted in 5 parts of acetic acid anhydride in the presence of 3 parts of acetic acid, and using 0.1% sulphuric acid catalyst based on the cellulose weight. The reaction reached a peak temperature of 90° C.

On completion of acetylation, a further addition of acetic acid was made to achieve the desired cellulose acetate concentration for wet spinning. The solution was filtered through a porous multi-sheet paper filter dressing and then extruded through a jet containing holes of 0.04 mm. diameter into a dilute acetic coagulating bath.

Filtration and spinning were accomplished without any difficulty.

The weight of cellulose acetate which could be filtered through 1 sq. cm. of standard dressing before it blocked completely was 13 gms.

*Example VII*

One part of cellulose was reacted with 4 parts of acetic acid anhydride in the presence of 1.7 parts of acetic acid and using 0.1% sulphuric acid catalyst based on the cellulose weight. The reaction reached a peak temperature of 92° C.

The resulting cellulose acetate solution was filtered through a composite paper-fabric filter and extruded through a spinning jet containing holes of 0.034 mm. diameter into a steam-heated air drying chamber. The filaments produced were of good colour and were collected on a bobbin in the usual way.

The weight of cellulose acetate which could be filtered through 1 sq. cm. of standard dressing before it blocked completely was 9 gms.

Example VIII

One part of cellulose was reacted with 5 parts of acetic anhydride in the presence of 1 part of acetic acid, and using 0.1% sulphuric acid catalyst, based on the cellulose weight. The reaction reached a peak temperature of 90° C. The resulting cellulose acetate was precipitated, washed, dried and ground. The cellulose acetate was then passed through melt extrusion equipment to produce filaments of good colour and of tenacity 1.1 gms./denier, elongation 25%.

This application is a continuation-in-part of United States Patent application S.N. 517,372, filed June 22, 1955.

We claim:

1. A process of preparing an extruded article which comprises filtering a solution prepared by esterifying cellulose with an aliphatic acid anhydride containing from 2 to 4 carbon atoms in the molecule in the presence of at least sufficient aliphatic acid containing 2 to 4 carbon atoms in the molecule to dissolve the cellulose ester as it is formed, and of sulphuric acid in amount at most 0.5% by weight as catalyst, the whole of the said sulphuric acid having been uniformly dispersed throughout the cellulose in the course of an activating pretreatment in which an aliphatic acid containing 1 to 4 carbon atoms in the molecule is employed, the esterification being effected at a temperature which reaches at least 50° C. and recovering the cellulose ester upon completion of esterification and neutralization of the catalyst, without requiring any removal of sulphuric acid from chemical combination with the ester, and extruding the filtered solution into a medium effective to cause evaporation of the solvent from the solution.

2. A process of preparing an extruded article which comprises filtering a solution prepared by esterifying cellulose with an aliphatic acid anhydride containing from 2 to 4 carbon atoms in the molecule in the presence of at least sufficient aliphatic acid containing 2 to 4 carbon atoms in the molecule to dissolve the cellulose ester as it is formed, and of sulphuric acid in amount at most 0.5% by weight as catalyst, the whole of the said sulphuric acid having been uniformly dispersed throughout the cellulose in the course of an activating pretreatment in which an aliphatic acid containing 1 to 4 carbon atoms in the molecule is employed, the esterification being effected at a temperature which reaches at least 50° C. and neutralizing any residual sulfuric acid but without requiring any removal of sulfuric acid from chemical combination with the ester, and then directly extruding the hot filtered solution to form an extruded article.

References Cited in the file of this patent

UNITED STATES PATENTS 2,768,870    Drisch et al. _____ Oct. 30, 1956